United States Patent [19]

Paskalov et al.

[11] Patent Number: 5,328,576

[45] Date of Patent: Jul. 12, 1994

[54] GAS PLASMA TREATMENT FOR WATER AND OIL PROOFING OF FABRICS AND PAPER

[75] Inventors: Georgy Z. Paskalov; Svetlana A. Krapivina; Alexander K. Filippov, all of St. Petersburg, U.S.S.R.

[73] Assignee: Plasma Plus, Los Angeles, Calif.

[21] Appl. No.: 864,431

[22] Filed: Apr. 6, 1992

[51] Int. Cl.$^5$ .................................. H05F 3/00
[52] U.S. Cl. ................................ 204/164; 204/165; 204/130; 204/131; 204/132
[58] Field of Search ............... 204/164, 165, 130, 131, 204/132

[56] References Cited

U.S. PATENT DOCUMENTS

| | | | |
|---|---|---|---|
| 4,419,869 | 12/1983 | Sando et al. | 204/165 |
| 4,465,738 | 8/1984 | Chang | 204/168 |
| 4,606,930 | 8/1986 | Ueno et al. | 204/165 |
| 4,693,799 | 9/1987 | Yanagihara et al. | 204/165 |
| 4,772,348 | 9/1988 | Hirokawa et al. | 204/165 |

*Primary Examiner*—John Niebling
*Assistant Examiner*—Kishor Mayekar
*Attorney, Agent, or Firm*—Natan Epstein

[57] ABSTRACT

An improved method for imparting water and oil repellent surface properties to fabrics or paper includes pretreatment in a low pressure oxygen plasma in the presence of water vapor followed by plasma polymerization of methane in a high frequency glow discharge carried out in the same treatment chamber. The resultant polymer film formed on the material surface resists separation from the treated material even after prolonged immersion in water. The method is characterized by use of low cost and readily available starting monomer, by use of a single treatment unit for all stages of the process, reduced energy requirements and treatment time, and improved results over conventional processes.

7 Claims, 1 Drawing Sheet

GAS PLASMA TREATMENT FOR WATER AND OIL PROOFING OF FABRICS AND PAPER

BACKGROUND OF THE INVENTION

1. Field of the Invention

This invention relates to surface treatments for textiles and paper products for imparting resistance to impregnation by liquid to the treated materials, and in particular is directed to gas plasma treatments for that purpose.

2. State of the Prior Art

The production of high quality textiles or paper calls for efficient methods for imparting soil-resistance to the textile or paper materials. Polymer surface coatings have been used to this end. Currently practiced methods of coating a paper surface with such a film involve at least seven distinct stages:

synthesis of a monomer;
polymerization of the monomer with formation of intermediate or end polymer;
preparation of a film forming solution;
cleaning of the surface or application of a bonding agent to the surface;
application of the coating;
drying of the coating;
solidification of the coating.

The basic disadvantages of these methods include the large number of stages involved in the process as well as unevenness and excessive thickness of the resultant coating, which leads to a change in the appearance of the treated material.

Japanese patent 63-75002 describes treatment in an impulse or pulsed discharge in an atmosphere comprising the gases $CH_4$, $C_2H_6$ or $C_4H_{10}$ for increasing the durability and thermal stability of ferromagnetic layers of magnetic tapes. This method cannot be applied to fabrics because the film formed during the process changes the appearance of the treated surface.

Another prior method of achieving film plasma polymerization, described in U.S. Pat. No. 4,188,426, includes treatment in a glow discharge of per-fluoro-cyclo-butane or hexafluoroethane to reduce the friction coefficient and to improve the surface hydrophobia of organic and inorganic substrates (e.g. polyethylene films, metals). This method also cannot be applied to fabrics because the film formed during the process changes the appearance of the treated surface. In addition, the use of fluoro containing monomers is contraindicated by ecological considerations.

A known method of water and oil repellent finishing of textiles, described in USSR Patent 1,158,634, includes plasma treatment in a glow discharge in an atmosphere of inorganic gases, followed by treatment with a fluoro containing acrylic monomer in gas phase. The first stage of the process can cause additional destruction of archival documents when the documents interact with the gas that creates the plasma. The second stage forms too rough a film.

Another prior method of plasma formation of a thin film on the surface of polymer material, described in Japanese Patent 62-132940, includes:

1. plasma treatment in a glow discharge in an atmosphere of $H_2, CO, N_2, O_2$ gases;
2. plasma polymerization; and
3. treatment in hydrogen plasma.

The first stage is used to improve adhesion of the film surface for the subsequent polymerization stage. This first stage lasts from 20 sec to 30 minutes of time and can cause additional destruction of archive documents when the documents interact with the gas that creates the plasma.

A prior method described in USSR patent 642550 for treatment of rubber articles includes, treatment in a glow discharge; immersion in an emulsion of polytetrafluoro-ethylene; and treatment by glow discharge. The application of fluoro-containing monomers is an ecologically detrimental feature of this method.

Japan patent 62-260836 describes a surface plasma polymerization treatment of glass or synthetic sponges, including treatment in a glow discharge in an atmosphere of nitroethane or nitropropane. This method cannot be applied fabrics or paper because the film formed by the process changes the appearance of the treated surface. Also, use of nitro-compounds is ecologically undesirable.

Patents of Japan 62-132940; EPW—Japan, 0177364; Japan, 61-221236; Japan; and USSR 1158634 describe pretreatment of materials in a plasma of inorganic gas for 40 sec. to 20 minutes to purify and activate surfaces for subsequent processing. As a result, polymer films deposited by a subsequent polymerization stage adhere better to the treated material surfaces. However, in some instances satisfactory treatment results require discharge power levels which are harmful or destructive to the material being treated.

A prior method of depositing a thin surface film by a plasma polymerization process (Japanese patent 62-132940) includes treatment in a glow discharge of $H_2$, CO, $N_2$ or $O_2$ at p=0.05–5 Torr, t=30 sec—20 min, power 5–50 KWt; then a plasma polymerization stage, followed by plasma treatment in hydrogen. The film obtained by this method is characterized by improved durability, but changes the appearance of the treated surface and physico-mechanical properties of materials.

Japanese patent 61-22136 discloses a method of surface preparation before coating of polyolefine articles which includes the steps of treatment by a fluoro-organic solvent, staining in a glow discharge of oxygen, and coating. The film obtained by this method is characterized by improved strength to peeling and water resistance. Use of fluoro-containing solvent however is an ecologically undesirable feature of this method.

What is needed is a method for imparting liquid resistant surface properties to fabrics and paper products which do not alter the appearance nor physically damage the treated material, which involves a minimum of processing of the item, which can be safely used on various materials, which is not ecologically damaging, and which is simple and dependable.

SUMMARY OF THE INVENTION

The present invention is an improved method for applying a durable water and oil-repellent finish to textile fabrics, fibers and paper materials. The finish obtained includes a thin polymer coating formed by plasma polymerization on the surface of the material. The polymer coating does not alter the appearance nor the physical and mechanical properties of the treated materials.

The novel method includes a first, surface preparation and activation stage before the second or plasma polymerization stage. The surface of the subject material is first treated in a low temperature plasma of an inorganic gas, preferably oxygen gas. The concentration of active components in the plasma is increased by addition of water vapor at a concentration is between 0.05 and 0.5% to the oxygen gas, resulting in superior activation and preparation of the surfaces with shortened treatment times as compared to treatment with dry gas. This makes the activation process more economical and commercially attractive.

According to this improved method, textile fabrics and paper products are exposed to a low temperature plasma of methane gas at a pressure of between 0.01 and 10 Torr, input power generator frequency of 1–40 MHz at a specific discharge power of 0.003 to 3.0 Wt/cm$^3$, for 30 sec to 3600 sec The materials may be first exposed to a low pressure oxygen plasma before exposure to the methane gas plasma. Water vapor to a concentration of between 0.05 to 0.5% may be added to the oxygen plasma. Exposure to the oxygen plasma takes place at a pressure of 0.01 to 10 Torr, with input power generator frequency of 1 to 40 MHz at specific discharge power of 0.003 to 3.0 Wt/cm$^3$, for a treatment time ranging from 3.0 sec to 60 sec.

The presently preferred method for imparting water and oil repellent surface properties to materials including textile fabrics and paper products comprises the steps of first exposing the materials to a low pressure oxygen plasma including water vapor at a concentration of between 0.05 to 0.5%, at a pressure of 0.01–10 Torr, input power generator frequency of 1 to 40 MHz with specific discharge power of 0.003 to 3.0 Wt/cm$^3$, for a treatment time ranging from 3.0 sec to 60 sec; and then exposing the materials to a low temperature plasma of methane gas at a pressure of between 0.01 and 10 Torr, input power generator frequency of 1 to 40 MHz at a specific discharge power of 0.003 to 3.0 Wt/cm$^3$ for 30 sec to 3600 sec.

DESCRIPTION OF THE PREFERRED EMBODIMENTS

Figure 1:
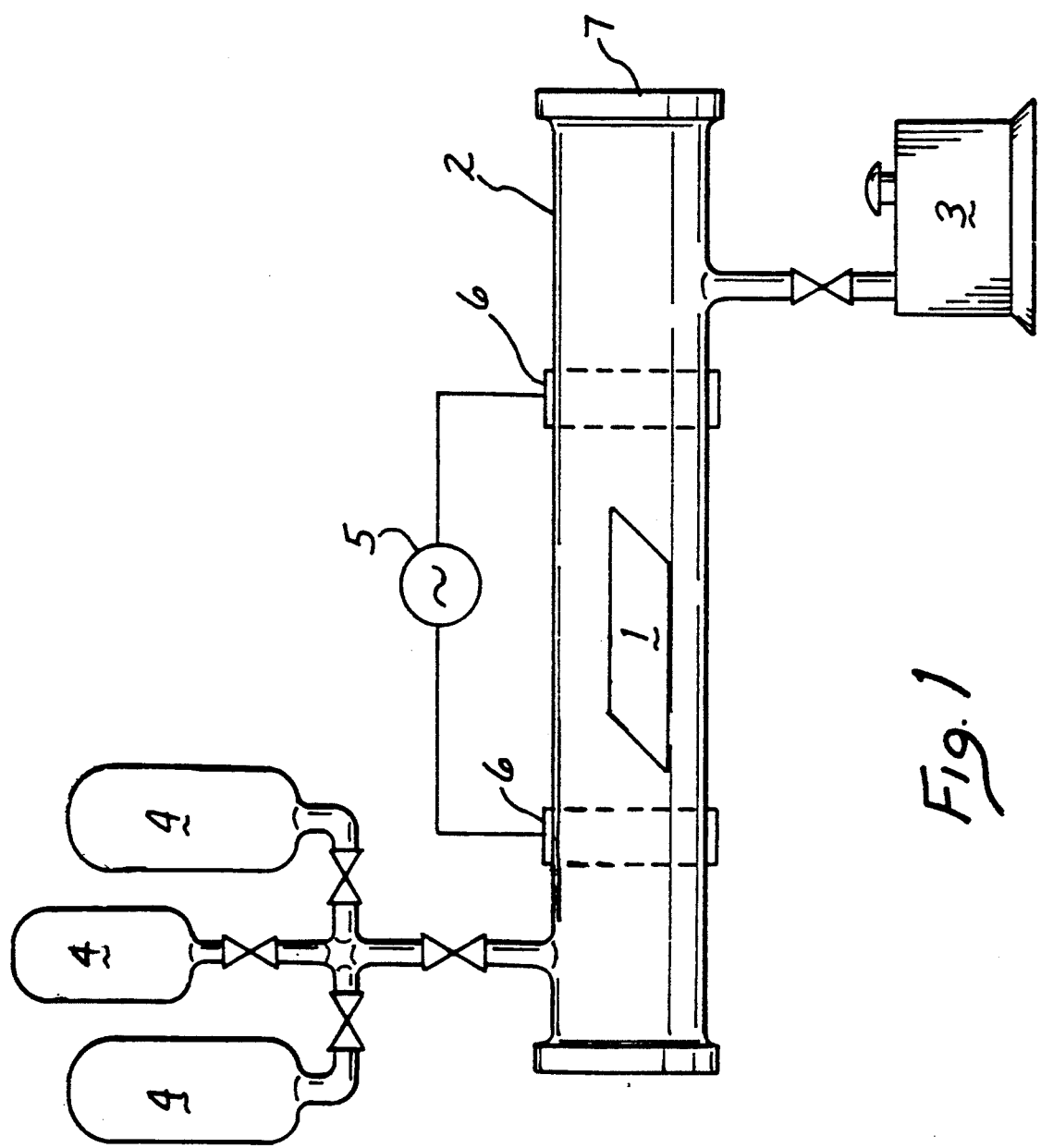
FIG. 1 is a schematic illustration of a low pressure gas plasma chamber for use in material treatment according to the improved processes of this invention.

The novel method includes a first, surface preparation and activation stage and a second, plasma polymerization stage.

The surface of the subject material is first treated in a low temperature oxygen plasma. Atomic oxygen, ozone and other highly reactive particles are formed in an oxygen plasma. The concentration of these components determines the speed and depth of the surface activation and treatment process. The addition of water vapor has been found to intensify the surface activation process in inorganic gas plasmas when water vapor concentration is between 0.05 and 0.5%. A further increase in water vapor concentration however is counterproductive as it hinders the surface activation process and can lead to extinction of the glow discharge.

Addition of water vapor in concentrations of 0.05–0.5% during the pretreatment stage has been found to achieve activation of the surfaces of the subject material, before polymerization, at a lower specific power of the gas discharge and in a shorter time than with dry gas. In addition, after polymerization, the wetting angle is increased and surface energy of the treated material is decreased, and stronger bonding of the polymer film occurs, so that the polymer films do not separate from the substrate material even following prolonged immersion in water.

The plasma polymerization generally includes processes occurring in the gaseous phase (i.e., in the plasma volume), and processes taking place on the surface being treated. In electrical glow discharges generated under low pressure, the main activation process involves collisions of free electrons accompanied by dissociation of the monomer:

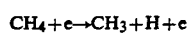
$CH_4 + e \rightarrow CH_3 + H + e$

$CH_4 + e \rightarrow CH_2 + H_2 + e$ and by ionization of the formed free radicals:

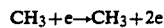
$CH_3 + e \rightarrow CH_3 + 2e$

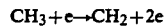
$CH_3 + e \rightarrow CH_2 + 2e$

Under low pressure conditions the main recombination process involves surface phenomena. Energy is released in the course of recombination, including kinetic energy of the ions and the ionization energy of the same. The energy released leads to the formation of so-called growth centers on the surface being treated:

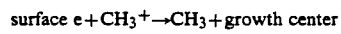
surface $e + CH_3^+ \rightarrow CH_3 +$ growth center

Formation of polymer film on the surface can be described by the following reactions:

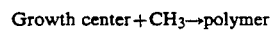
Growth center $+ CH_3 \rightarrow$ polymer

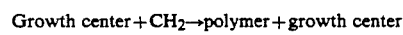
Growth center $+ CH_2 \rightarrow$ polymer $+$ growth center

Formation of the polymer can be understood to include formation of the building blocks in the gas phase, and completion of polymer formation on the surface being treated.

Use of methane as the sole starting monomer in the plasma polymerization stage leads to formation of a polymer film consisting of considerably branched carbon chains, which results in advantageous surface film properties. It is important to this type of treatment that the new surface characteristics obtained be stable over long periods of time. Films formed by methane plasma polymerization are characterized by high adhesion to the substrate. This is attributed to the absence of reaction capable groups in methane, which results in the plasma polymerization proceeding at a relatively slow rate. Films formed by methane plasma polymerization are further characterized by low permeability to air and water, and strong hydrophobic properties. For a 1000 Angstrom film thickness, the permeability is $7.57 \times 10^{-13}$ cm$^3$/cm$^2$ sek.cm.h.c. That is significantly lower than the permeability of polymer films obtained by conventional methods (polyethylene—$9 \times 10^{-9}$; polyvinilchloride—$5 \times 10^{-11}$).

The gas plasmas used in this treatment process are generated in a low pressure glow discharge. A main characteristic of this type of plasma is its non-isotermicity: $Te >> Ti = Tg$, where Te—temperature of electrons,
Ti—temperature of ions,
Tg—temperature of gas.
Typically: $Te = 30,000 K$; ; $Tg = 375 K$ The apparatus employed for the low pressure plasma treatment is schematically illustrated in FIG. 1 of the attached drawing. The plasma treatment is as follows. Material to be processed, indicated by the numeral 1, is placed in a vacuum chamber 2. Three gas bottles 4, separately containing the gases used in the process, are connected through suitable valves and conduits to the chamber 2. The chamber 2 is evacuated by means of vacuum pump 3 until the interior pressure of chamber 2 reaches 0.01 Torr. The vacuum system then is flushed with oxygen gas from one of bottles 4, and the chamber is again evacuated. Oxygen gas and water vapor are then fed, in metered amounts, into the system to a pressure from 0.01 to 10.00 Torr. Two cylindrical electrodes 6 are mounted to the exterior of the chamber 2 in axially spaced apart relationship. A high frequency electrical power generator 5 connected between the electrodes 6 lights a plasma generating glow discharge in the chamber 2 between the electrodes. The preferred specific power of the discharge is between 0.003 to 3 Wt/cm$^3$, and the discharge is sustained for 3 to 60 seconds. Power to the electrodes is then turned off. The chamber 2 is evacuated to a pressure of 0.01 Torr, and the vacuum system is flushed with methane from another of bottles 4. Methane gas is then fed to chamber 2 to a pressure of 0.01 tp 10 Torr. Power is again applied to the electrodes 6 to light the glow discharge. The specific power of the discharge is between 0.003 to 3 Wt/cm$^3$, and the discharge is sustained for 30 to 3600 seconds. Both power generator and vacuum pump are then turned off, the chamber 2 is brought to atmospheric pressure, and the treated material 1 is removed from the chamber by opening end closure 7. The cylindrical electrodes may be replaced by electrode plates diametrically opposed on the exterior of the cylindrical chamber 2.

Fabrics and paper treated by this process acquire water and oil repellent properties. It was found that the absorption time for water drops placed on a treated surface is greater than its evaporation time on that surface. The degree of surface activation of treated fabrics can be evaluated by measurement of capillary absorption of the samples, as set forth in Tables 1-3.

Comparison of three types of paper before and after plasma-chemical treatment showed that the strength characteristics of the samples are practically unaffected by the thin polymer layer deposited on their surface. The strength characteristics of treated samples were found substantially unchanged after thermal and ultraviolet aging of the samples. Deformation characteristics of initial and treated paper samples were found to be practically the same. Consequently, application of a thin polymer layer does not affect strength and deformation characteristics of the paper substrate, but leads, however, to virtual loss of capillary absorption of the treated material.

EXAMPLE 1

A 150×150 mm sample of woolen fabric with specific density 495 g/mm is placed in the discharge chamber 2 with external cylindrical electrodes 6. Air is extracted to a pressure of 0.01 Torr. Oxygen with water vapor added to a concentration of 0.1% is fed into the chamber to a pressure of 0.5 Torr. A glow discharge is ignited by supplying high frequency voltage (13.56 MHz) to the electrodes 6 with a specific power discharge of 0.15 Wt/cm$^3$. The discharge is extinguished after 30 sec, and gas is evacuated from the chamber to a pressure of 0.01 Torr. This is followed by the introduction of methane into the system a pressure of 0.5 Torr.

The glow discharge is again ignited by supplying high frequency voltage (13.56 MHz) to the electrodes with a specific power discharge of 0.15 Wt/cm$^3$. The discharge is extinguished after 450 sec.; vacuum pumping is stopped, air is admitted into the system and the sample 1 is taken out of the discharge unit. The sample is then subjected to testing after treatment. The wetting angle measurements were performed within 10 min. after finishing the plasma polymerization treatment.

The oil repellent score of the sample after treatment was measured as 120. A drop of water placed on the sample did not spread after several hours, and gradually evaporated. The sample elongation before break in the wet state of the treated sample was 23.2%, increased from 19% for the dry untreated sample and 21% for the treated sample. Water column resistance increased from 0 to 190 cm after treatment. In other words, the untreated initial sample wets with water and oil practically at once. The treated sample shows water and oil repellent properties.

Separation of the polymer film from the sample material did not occur after the sample was boiled in water for one hour. The mechanical strength and deformation properties of the sample remained unchanged.

EXAMPLE 2

A sample of sulfite paper (containing sizing agents: high-resin glue—0.5%, alumina—0.5%; cooling filler—25%) was placed in the discharge unit 2 with external cylindrical electrodes 6, but specific power of electrical discharge was adjusted to 0.75 Wt/cm$^3$ (for both stage 1 and 2 of the treatment process, and treatment by plasma polymerization proceeded for 360 sec as in Example 1.

The following properties of the sample were determined in accordance with methods known and accepted in the paper industry:
tensile strength and stretching;
tear resistance;
deformation in wet state;
whiteness of spherical photometer.

Paper durability was estimated according to the stability of its strength characteristics following thermal (@T=100+3 deg. C.) aging for 30 days and exposure to ultra violet radiation on both sides under a UV lamp for 60 min.

Comparison of strength and deformation characteristics of treated paper samples (before and after thermal and UV aging) showed that these characteristics are substantially unaffected by the thin polymer layer, which however leads to virtual loss of capillary absorption of the treated material. Capillary absorption of the untreated sample was 36 mm/10 min. The treated sample had no absorption. The wetting angle of the treated sample was 115 degrees. After the sample was kept in the water for one month neither separation of the film nor change of sample properties occurred.

EXAMPLE 3

A sample of woolen fabric with density 540 g/m$^2$ was placed in the discharge unit 2 with parallel electrodes diametrically opposed on the chamber exterior, and treated under conditions the indicated in example 2, but the specific power of the electrical discharge was adjusted to 1.5 Wt/cm$^3$ (for both stage 1 and 2 of the process). The pretreatment or activation stage 1 proceeded for 3 sec. and the polymerization stage 2 proceeded for 120 sec.

The longitudinal elongation before break of a 50×100 mm sample when dry increased, as a result of treatment, from 9.5% (untreated sample) to 11.0%, and from 15.2 (untreated sample) to 16.4% when wet.

Water resistance of the untreated sample was 260 cm in water. Water resistance of the sample treated in plasma was 420 cm in water. A drop of water placed on the sample did not spread over the surface after several hours, gradually evaporating. The oil repellent score was 120. The colors of fabric did not fade after exposure to ultraviolet radiation.

EXAMPLE 4

A sample of newsprint paper (containing sulfate unbleached cellulose—25%, white pulp mass—75%, filler—not more than 5%) was placed in the discharge unit 2 with external cylindrical electrodes 6, and treated under the conditions indicated in example 2, but the frequency of electrical discharge was adjusted to 6.25 MHz.

Mechanical properties of the treated sample were not degraded after thermal and UV aging. Time of absorption of a water drop for the untreated sample was 3 sec. The treated sample showed no capillary absorption. The absorption time for water is greater than its evaporation time on the treated surface. The wetting (contact) angle of water was 110 degrees. After thermal and UV aging these characteristics were unchanged. These surface characteristics of the treated sample do not deteriorate, and the polymer coating on the treated surface does not separate from the sample after immersion of the sample in water.

TABLE 1
EFFECT OF WATER VAPOR CONCENTRATION ON INTENSITY OF SURFACE ACTIVATION UNDER FIXED TREATMENT CONDITIONS

| Specific Power Wt/cm3 | Time of Treatment Sec | ($H_2O$) % | Capillary Absorption mm/10 min |
|---|---|---|---|
| 0 initial | 0 | 0 | 21 |
| 0.3 | 60 | 0 | 24 |
| 0.3 | 60 | 0.05 | 26 |
| 0.3 | 60 | 0.1 | 28 |
| 0.3 | 60 | 0.15 | 30 |
| 0.3 | 60 | 0.2 | 31 |
| 0.3 | 60 | 0.3 | 30 |
| 0.3 | 60 | 0.4 | 27 |
| 0.3 | 60 | 0.5 | 25 |
| 0.3 | 60 | 0.6 | 21 |

The added water vapor activates the plasma process and increases the capillary absorption of the treated sample compared to results obtained by existing methods. As seen from the table, the maximum activation was obtained at ($H_2O$) = 0.2 to 0.25% concentration.

TABLE 2
EFFECT OF TREATMENT TIME ON SURFACE ACTIVATION AT MOST EFFICIENT CONCENTRATION OF WATER VAPOR AND FIXED SPECIFIC POWER

| Specific Power Wt/cm3 | Time of Treatment Sec. | Capillary Absorption at ($H_2O$) = 0.0 mm/10 min | ($H_2O$), % | Capillary Absorption mm/10 min |
|---|---|---|---|---|
| 0 initial | 0 | 21 | 0 | 21 |
| 0.15 | 10 | 21.5 | 0.2 | 22.5 |
| 0.15 | 20 | 22 | 0.2 | 24.5 |
| 0.15 | 30 | 22.5 | 0.2 | 26 |
| 0.15 | 40 | 23 | 0.2 | 28 |
| 0.15 | 50 | 23.5 | 0.2 | 29 |
| 0.15 | 60 | 24 | 0.2 | 30 |

TABLE 3
EFFECT OF SPECIFIC POWER OR SURFACE ACTIVATION AT MOST EFFICIENT CONCENTRATION OF WATER VAPOR AND FIXED TREATMENT TIME

| Specific Power Wt/cm3 | Time of Treatment Sec | Capillary Absorption mm/10 min at ($H_2O$) = 0.0 | ($H_2O$), % | Capillary Absorption mm/10 min |
|---|---|---|---|---|
| 0 initial | 0 | 21 | 0 | 21 |
| 0.003 | 10 | 21 | 2.0 | 23 |
| 0.5 | 10 | 21 | 2.0 | 25 |
| 1.0 | 10 | 22 | 2.0 | 26.5 |
| 1.5 | 10 | 23 | 2.0 | 28 |
| 2.0 | 10 | 24 | 2.0 | 29 |
| 2.5 | 10 | 25 | 2.0 | 30 |
| 3.0 | 10 | 26 | 2.0 | 30.5 |

Addition of water vapor in .05–.5% concentration allows surface activation before polymerization at a lower specific power and in a shorter time than activation with dry gas. This makes the activation process more economical.

TABLE 4
EFFECT OF POLYMERIZATION TREATMENT TIME ON PROPERTIES OF PAPER

| | Specific Power Wt/cm3 | Time of Polymerization sec. | Capillary Absorption mm/10 min | Contract Angle of Water, Degrees |
|---|---|---|---|---|
| Sulphate Paper | 0 initial | 0 | 37 | — |
| | 0.5 | 15 | 15 | 74 |
| | 0.5 | 20 | 5 | 83 |
| | 0.5 | 30 | 0 | 106 |
| | 0.5 | 60 | 0 | 112 |
| | 0.5 | 3600 | 0 | 108 |
| | 0.5 | 3600 | 0 | |
| | 0.5 | 3700 | 0 | 115 |

TABLE 5
EFFECT OF SPECIFIC POWER DURING POLYMERIZATION STAGE ON PROPERTIES OF PAPER

| | Time of Polymerization Sec. | Specific Power Wt/cm3 | Capillary Absorption mm/10 min | Contact Angle of Water Degrees |
|---|---|---|---|---|
| Newsprint | 0 initial | 0 | 49 | — |
| | 600 | 0.002 | 24 | 68 |
| | 600 | 0.0025 | 7 | 85 |
| | 600 | 0.003 | 0 | 95 |
| | 600 | 0.5 | 0 | 97 |
| | 600 | 1.0 | 0 | 103 |
| | 600 | 2.0 | 0 | 107 |
| | 600 | 3.0 | 0 | 112 |
| | 600 | 3.0 | 0 | 109 |
| | 600 | 3.5 | 0 | 113 |

What is claimed is:

1. A method for imparting water and oil repellent surface properties to materials including textile fabrics and paper products comprising the steps of:
   pretreating said materials in a low pressure plasma comprised of a mixture of oxygen and water vapor; and
   then treating said materials in a low temperature methane plasma under conditions conducive to polymerization of said methane on said materials.

2. The method of claim 1 wherein said step of pretreating is for a time period of from 30 to 60 seconds and said step of treating is for a time period of from 30 to 3600 seconds.

3. A method for activating the surfaces of materials prior to plasma polymerization for imparting water and oil repellent surface properties to materials including textile fabrics and paper products, comprising the steps of:

preparing a mixture of an inorganic gas, and water vapor, exposing said materials to a low pressure plasma comprised of said mixture of the inorganic gas and water vapor, and then subjecting said materials to said plasma polymerization.

4. The method of claim 3 wherein said water vapor is present at a concentration of between 0.05 to 0.5%.

5. The method of claim 4 wherein said inorganic gas is oxygen.

6. The method of claim 4 wherein said step of exposing is for a time period of from 30 to 60 seconds.

7. A method for imparting water and oil repellent surface properties to materials including textile fabrics and paper products comprising the steps of:

first exposing said materials to a low pressure plasma comprising of an inorganic gas including water vapor at a concentration of between 0.05 to 0.5%, at a pressure of 0.01–10 Torr, at an input power generator frequency of 1 to 40 MHz with specific discharge power of 0.003 to 3.0 Wt/cm3, for a pretreatment time ranging from 3.0 seconds to 60 seconds; and then exposing said materials to a low temperature plasma of methane gas at a pressure of between 0.01 and 10 Torr, input power generator frequency of 1–40 MHz at a specific discharge power of 0.003 to 3.0 Wt/cm3 for a treatment time of 30 seconds to 3600 seconds.

* * * * *